United States Patent Office 3,353,457
Patented Nov. 21, 1967

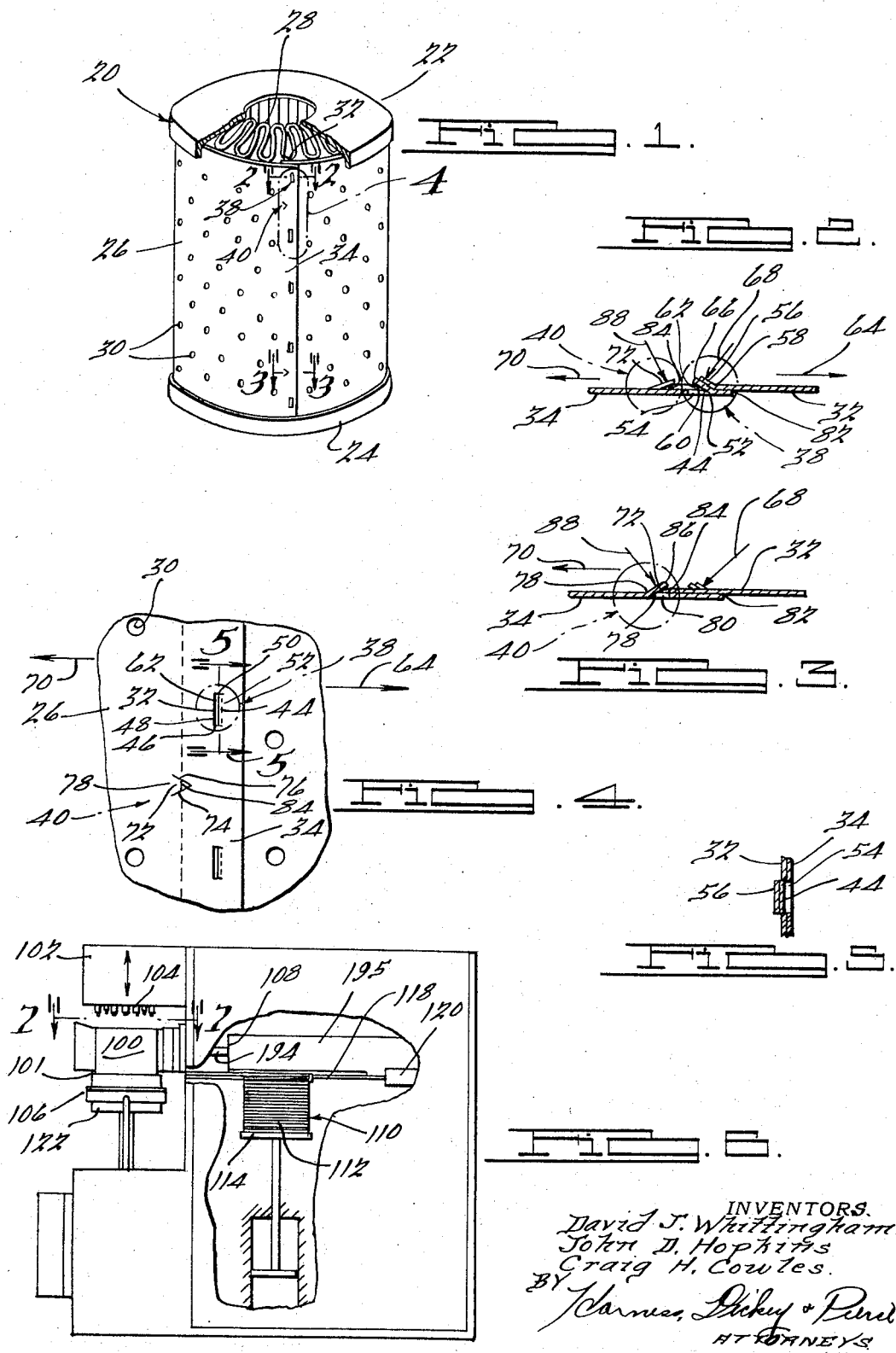

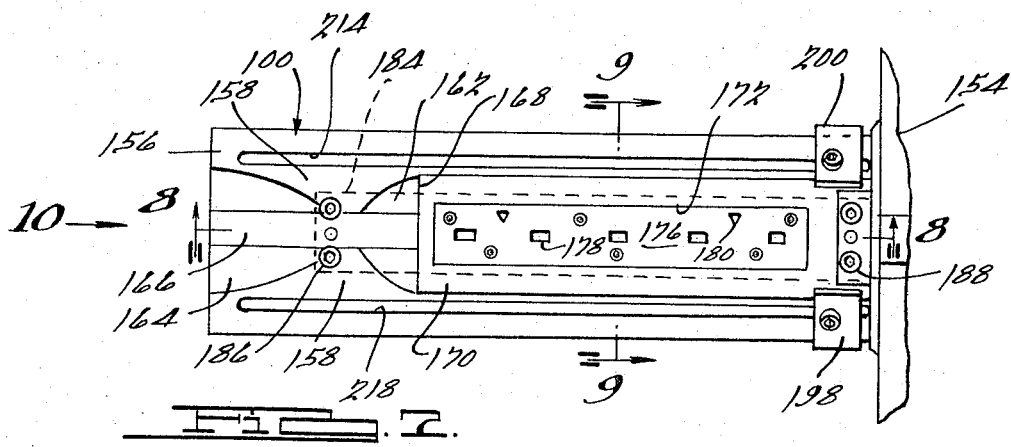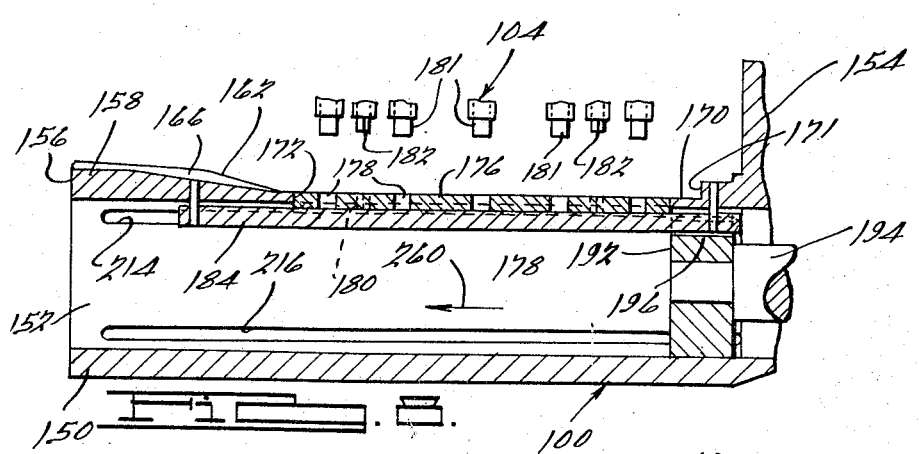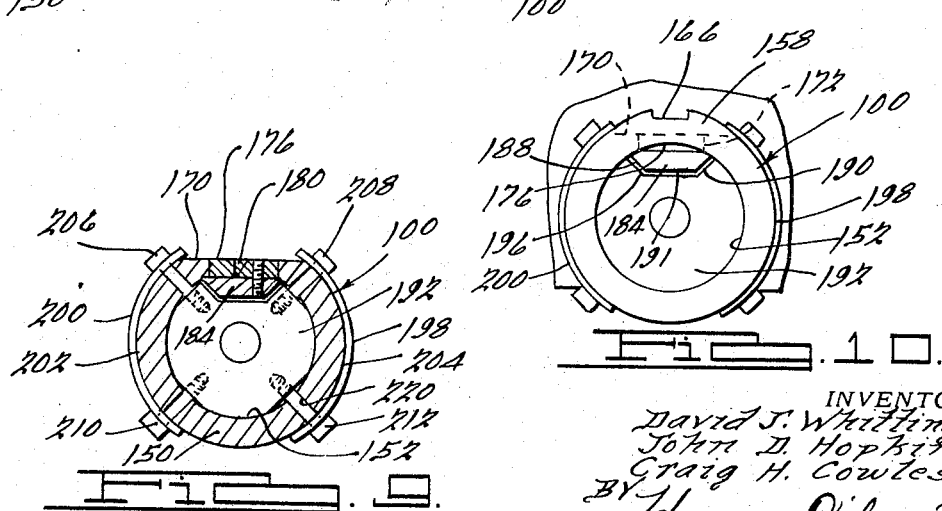

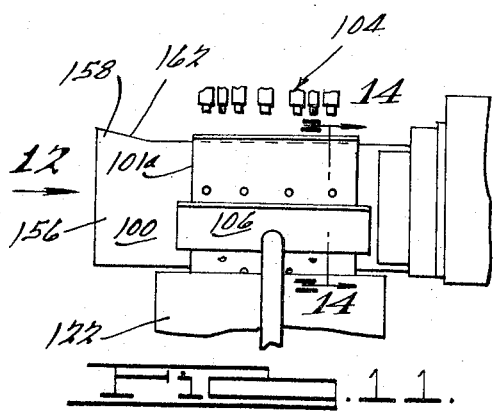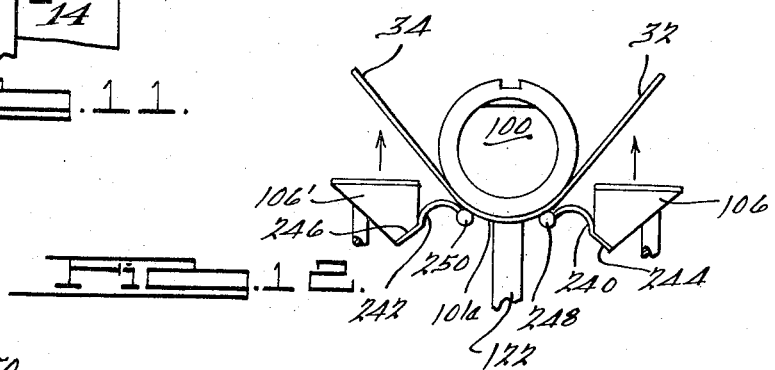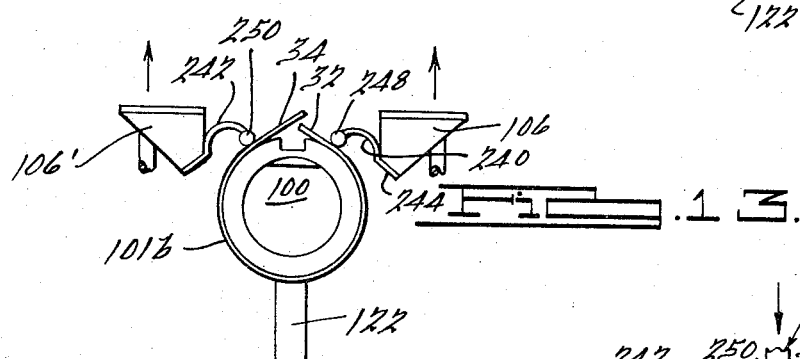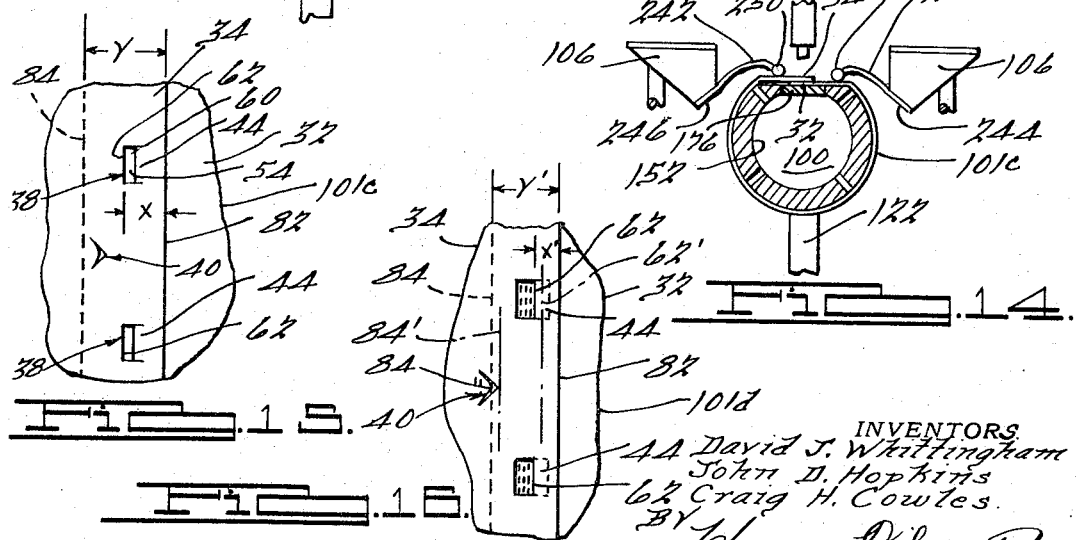

3,353,457
METHOD OF MAKING A TUBULAR ELEMENT
David J. Whittingham and John D. Hopkins, Franksville, and Craig H. Cowles, Manitowoc, Wis., assignors to Walker Manufacturing Company, Racine, Wis.
Continuation of application Ser. No. 232,503, Oct. 23, 1962. This application Oct. 22, 1965, Ser. No. 522,334
11 Claims. (Cl. 93—1.1)

This invention relates to the formation of a cylindrical band from a flat sheet of material, and is a continuation of our copending patent application Ser. No. 232,503, filed Oct. 23, 1962, and now abandoned.

In the manufacture of filter units, one of the components generally required is a perforated paper shell which surrounds and provides an outer cover for filtering material. Paper filter shells are conventionally formed into cylindrical shape from a flat perforated sheet of paper. The paper sheet has commonly been held in the cylindrical form by overlapping and gluing opposite end portions thereof. In some instances, other external fastening devices such as staples have been used.

The object is to provide a method of fastening the open overlapped ends of a cylindrical article formed from flat sheet material.

The principles of the present invention are hereinafter disclosed in detail by reference to an illustrative embodiment of the invention shown in the accompanying drawings wherein:

FIGURE 1 is a perspective view of a filter unit incorporating a filter shell made in accordance with the principles of the present invention;

FIGURE 2 is a partial sectional view taken along the line 2—2 in FIGURE 1;

FIGURE 3 is a partial sectional view taken along the line 3—3 in FIGURE 1;

FIGURE 4 is an enlarged partial side elevational view in the area 4 in FIGURE 1;

FIGURE 5 is a partial sectional view taken along the line 5—5 in FIGURE 4;

FIGURE 6 is a side elevational view of apparatus for forming the filter shell shown in FIGURE 1;

FIGURE 7 is an enlarged sectional view taken along the line 7—7 in FIGURE 6;

FIGURE 8 is a sectional view taken along the line 8—8 of FIGURE 7;

FIGURE 9 is a sectional view taken along the line 9—9 of FIGURE 7;

FIGURE 10 is an end view of the apparatus shown in FIGURE 7 taken in the direction of the arrow 10;

FIGURE 11 is an enlarged partial side elevational view of a portion of the apparatus shown in FIGURE 6;

FIGURE 12 is an end view taken in the direction of the arrow 12 in FIGURE 11 showing an initial stage of the manufacturing process of the present invention;

FIGURE 13 is an additional end view showing a subsequent stage of the manufacturing process;

FIGURE 14 is a sectional view taken along the line 14—14 in FIGURE 11 and showing still another stage of the manufacturing process;

FIGURE 15 is an enlarged partial view of a portion of a filter shell formed as shown in FIGURE 10 and after a punching operation thereon; and FIGURE 16 is an enlarged partial view corresponding to FIGURE 15 and showing a portion of a filter shell after completion of the manufacturing process.

Referring now to FIGURE 1, an illustrative embodiment of the present invention in the form of a filter unit 20 is shown. The filter unit comprises end caps 22, 24 and a cylindrical shell 26 which enclose a filtering material 28. The filter shell 26 is conventionally made from a flat sheet of paper material having a plurality of perforations 30. The flat sheet is formed into the cylindrical shape shown and opposite ends 32, 34 of the sheet are overlapped and fixedly secured to one another.

The present invention is primarily directed to means for securing the overlapped end portions 32, 34 to one another. The length of the sheet of material 26 between the opposite end portions 32, 34 is substantially longer than the length of the circumference of the cylinder to be formed so that a substantial area or zone of overlap between the ends 32, 34 will exist when the flat sheet has been formed into the desired cylindrical shape. The area of overlap is, of course, defined by the circumferentially spaced side edges of the end portions 32, 34. In order to secure the sheet of material in the desired cylindrical form, a plurality of fastening means are integrally formed along the end portions 32, 34 in the area of overlap. The fastening means have two forms as shown at 38 and 40. In the illustrative embodiment of FIGURE 1, five of the fastening means 38 and two of the fastening means 40 are shown. However, the number and location of the fastening means may be varied as desired.

Referring now to FIGURES 2, 4 and 5, the fastening means 38 comprise a substantially rectangular tab means 44 integrally formed in the overlap area of the end portion 34. The tab means 44 is severed from the end portion 34 on three sides 46, 48, 50 and is integrally connected to the end portion 34 along the other side 52. The tab means 44 is displaced radially inwardly from the plane of the adjoining surfaces of the end portion and forms an acute angle therewith. In the radially inwardly displaced position of the tab means, a rectangular slot 54 having substantially the same peripheral configuration is defined in the end portion 34.

The fastening means 38 further comprises tab means 56 integrally formed in the overlap area of the end portion 32 and having a peripheral configuration substantially identical to that of the tab means 44. In fact, the tab means 56 is simultaneously formed during the formation of the tab means 44 as will be hereinafter described. Accordingly, the tab means 56 has a substantially rectangular peripheral configuration defined by several side surfaces corresponding to the sides 46, 48, 50 and is integrally connected at 58 to the end portion 32. The tab means 56 extends radially inwardly from the end portion 32 and defines an acute angle with the adjacent surfaces. A slot 60 is formed by the radial inward displacement of the tab means 56 and includes an abutment wall portion 62 located opposite the integral connections 58.

The abutment wall portion 62 and the tab means 44, 56 cooperate to provide motion limiting means preventing movement of the end portion 32 relative to the end portion 34 in the direction of the arrow 64. In the fastened position, the tab means 44 extends through the slot 60 in the end portion 32 and abuttingly engages the abutment wall portion 62. As shown in FIGURE 2, the end 66 of the tab means 44 extends beyond the abutment wall portion 62 and forms an overlap therewith. Consequently, movement of the end portion 32 in the direction of the arrow 64 is restricted by engagement between abutment wall portion 62 and the tab means 44. The tab means 44 is biased toward the slot 54 by the inherent resiliency of the material along the integral connecting portion 58 between the tab means and the adjacent portion of the sheet. Consequently, the end portion 32 adjacent the slot 60 is squeezed between the tab means 44 and the end portion 34. An additional resistance to movement in the direction of the arrow 64 is provided by the tab means 56 which intimately engages the tab means 44 and provides an additional outwardly directed force. The force exerted by the inherent resiliency of the tab means 44, 56 is in the direction of the arrow 68 and therefore components of force both normal and parallel to the plane of the end portions are provided to prevent movement of the end portion 32 parallel to the end portion 34 or away therefrom at right angles thereto.

Referring now to FIGURES 3 and 4, the fastening means 40 is provided to prevent movement of the end portion 32 relative to the end portion 34 in the direction of the arrow 70. The fastening means 40 comprising a tab means 72 having a substantially triangular configuration defined by severed side surfaces 74, 76 and a side surface 78 which is integrally connected to the end portion 34. The tab means 72 is radially inwardly displaced and, in that position, defines a slot 80 having a similar peripheral configuration. The tab means 72 defines an acute angle with the adjacent surface of the end portion 34 which opens toward the tab means 44, 56, and therefore extends radially inwardly in a direction opposite to that of the tab means 44, 56 to define a fastening pocket therebetween. The tab means 72 is circumferentially spaced from the tab means 44, away from the side edge 82 of the end portion 34, a distance enabling the side edge 84 of the end portion 32 to be simultaneously abuttingly engaged with the tab means 72 when the abutment 62 is engaged with the tab means 44. The end 86 of the tab means 72 extends beyond the end 84 of the end portion 32 and forms an overlap therewith. The tab means 72 is biased radially outwardly toward the slot 80 by the inherent resiliency of sheet material in integral connecting portion 78. A force is therefore exerted by the tab means 72 on the end portion 32 adjacent the edge 84 in the direction of the arrow 88. Accordingly, movement of the end portion 32 relative to the end portion 34 is restricted to prevent circumferential displacement of the end portions in the direction of the arrow 70 and at right angles thereto to prevent radial displacement thereof.

In summation, each of the tab means exert a fastening force in the direction of the arrows 68, 88 because of the tendency of the radially inwardly displaced tab means to return to the original position in the plane of the respective end portions. Consequently, the end portion 32 is retained between the tab means and securely fastened against movement in any direction. In this manner, a four-way interlock is provided. Although the principles of the invention may be practiced with tab means of alternative design, the particular configuration disclosed provides particularly advantageous results in that the rectangular tab means 44, 56 have maximum strength characteristics and the triangular tab means 72 facilitate assembly as will be hereinafter described. As many fastening means 38, 40 may be provided as are necessary to adequately secure the overlapped end portions 32, 34.

In order to obtain the interlock shown in FIGURES 1-5, a novel method and apparatus have been developed. Referring now to FIGURE 6, the apparatus comprises, in general: a sheet forming and support fixture 100 on which a flat sheet of material 101 is cylindrically formed and fastened, a punch head 102 having a set of movable punches 104 for forming integral fastening means in the cylindrical formed sheet, movable platen means 106 having finger means for forming the flat sheet into cylindrical form around the fixture 100, a stripper mechanism 108 for removing the formed sheet from the fixture 100 and simultaneously fastening the sheet in the cylindrical form, and sheet delivery means 110 for delivering flat sheets to the forming apparatus.

A stack 112 of flat sheets of perforated paper are provided on an elevator mechanism 114 of conventional design. A fluid actuated cylinder, or the like, may be provided to upwardly displace the elevator mechanism and maintain the top sheet of the stack in position for delivery to the fixture 100. The delivery mechanism 108 is of conventional design and comprises a shuttle means 118 which is reciprocably operable by a fluid actuated cylinder 120 to remove one sheet at a time from the top of the stack and deliver it to a position between the forming fixture 100 and a holding fixture 122. When a sheet 101 has been placed in position between the forming fixture and the holding fixture, the holding fixture is actuated upwardly to engage the bottom of the sheet by a conventional power cylinder and presses the sheet against the bottom of the forming fixture to secure the sheet thereto. Simultaneously, the platen means 106, 106' are vertically actuated upwardly by a conventional power cylinder means to begin the forming operation.

Referring now to FIGURES 7-14, the forming fixture 100 is shown to comprise a hollow cylindrical core 150 having a substantially cylindrical peripheral surface and a central bore 152. The core is secured at one end 154 in any suitable manner to support means. The outer end 156 of the core is provided with an enlarged portion 158 which extends radially outwardly beyond the periphery of the cylindrical surface thereof. The enlarged portion has an inclined approach surface 162 on one end and a slightly upwardly and outwardly tapering top surface 164. A slot 166 is centrally located in the enlarged portion 156.

The inclined approach surface 162 terminates at its lower end 168 in a flat surface 170 which forms seat means for the opposite overlapped ends of the sheet 101 in its completely formed position about the forming fixture. The seat means is substantially rectangular in plan view as seen in FIGURE 7. The flat surface 170 extends to the opposite end of the forming fixture and terminates in a shoulder 171. A rectangular slot 172 is centrally located within the seat means 170 and communicates with the central bore 152. A die plate 176 is mounted in the rectangular slot 172 and has a plurality of rectangular and triangular punch slots 178, 180 adapted to receive the punch members 104. As shown in FIGURE 8, the punch members have rectangular and triangular heads 181, 182. The punch plate 176 extends into the bore 152 and is supported by a longitudinally extending guide plate 184 which is secured at its ends to the forming fixture by suitable fastening means 186, 188. The guide plate 184 is provided with tapered side guide surfaces 188, 190 and a substantially flat bottom surface 191.

The guide plate 184 is adapted to slidably receive a stripper block 192 having a substantially cylindrical periphery with a diameter substantially equal to the diameter of bore 152. The stripper block is connected at one end to a cylinder rod 194 of a conventional fluid actuated device 195 and is reciprocably actuable thereby. The block 192 is provided with a slot 196 at its upper end having a configuration identical to that of the guide plate 184. The block 192 is thus slidably movable along the length of the guide plate 184 in the bore 152. The stripper means further comprises a pair of substantially semi-cylindrical stripper plates 198, 200 which have inner peripheral surfaces of a diameter substantially identical to the diameter of the cylindrical peripheral surface of the fixture 150. The stripper plates 198, 200 are therefore adapted to be slidably supported on the side surface of the cylindrical core. Suitable fastening means 206, 208, 210, 212 secure the stripper plates to the stripper block 192 and extend through longitudinally extending slots 214, 216, 218, 220 in the cylindrical core 150. Reciprocable movement of the block 192 causes reciprocable movement of the stripper plates 198, 200 along the core.

Referring now to FIGURES 11-14, the cylindrical formation of the sheet is illustrated. After the sheet 101 is secured at the bottom of the forming fixture 100 by the holding fixture 122 as shown in FIGURE 6, the platens 106, 106' are moved upwardly relative to the forming fixture 100. Platens 106, 106' are provided on each side of the folding fixture and each carry a plurality of inwardly extending resilient forming fingers 240, 242 which are adapted to engage and wipingly deflect the sheet 101 around the forming fixture. One end 244, 246 of the fingers is fixedly mounted on the platens and the other end is resiliently deflectable relative to the forming fixture. Sheet engaging ball ends 248, 250, or the like, are provided on the ends of the forming fingers.

The initial upward movement of the platens 106, 106' causes engagement of the spring fingers 240, 242 with the lower surfaces of the sheet of material 101 and upwardly deflects the end portions 32, 34 thereof to the position shown in FIGURES 11 and 12. As shown in FIGURE 13 continued upward movement of the platens 106, 106' wraps the sheet of material 101b around the cylindrical surface of the forming fixture 100. The upward movement of the platens 106, 106' may be slightly staggered so that the end portion 32 of the sheet of material will be folded onto the seat means 170 of the fixture 100 sooner than the end portion 34 as indicated in FIGURE 13. At the completion of the upward movement of the platens 106, 106', the resilient forming fingers 240, 242 extend inwardly over the seat means 170 and mantain the end portions 32, 34 of the sheet in a folded position on the seat means. The end portion 32 is folded under the end portion 34 and forms an overlap therewith as shown in FIGURE 10. At this time, the punch means 104 may be lowered to form the fastening means in the overlap area. The punch means 104 comprises a series of individual punch members spaced in the tab means patterns shown in FIGURE 1.

With a sheet 101c folded into the position shown in FIGURE 14 and after actuation of the punch means 104 to form the fastening means in the overlap area, the overlapped end portions 32, 34 of the sheet 101c will have a relationship as indicated in FIGURE 15. The triangular tab means 40 are located between the end surface 84 of the end portion 32 and the end surface 82 of the end portions 34. The slots 54, 60 formed by the radial inward displacement of the tab means 44, 56 are aligned. The abutment wall portion 62 is spaced a distance X from the side surface 82 of the end portion 34 and the side surfaces 82, 84 are spaced from one another a distance Y.

Upon actuation of the stripper means, the block 192 is moved outwardly in the direction of the arrow 260 in FIGURE 8. The stripper plates 198, 200 are carried therewith into engagement with the adjacent side edge of the cylindrically formed material 101c. Movement of the stripper plates along the cylindrical core slides the opposite side edge of the cylindrically formed material 101c into engagement with the sloping approach surface 162 of the enlargement 156. The cylindrically formed material 101c is forced up and over the enlargement 156 and radially expanded by the stripper means. The fastening means formed therein during the punching operation are received within the slot 166. As the cylindrically formed material is forced over the enlargement 156, it is expanded and the distance Y between the side surfaces 82, 84 of the end portions 32, 34 is subtantially reduced until the side surface 84 of the end portion 32 reaches a position 84' shown in FIGURE 16. In the expanded position 84', the side surface 84 is located between the fastening means 40 and the fastening means 38. Simultaneously, the abutment surface 62 of the slot 60 formed in the end portion 32 during formation of the tab means 56 is moved to the position 62' shown in FIGURE 16. The abutments 62 engage and deflect the tabs 44, 56. The side edge 84 slides over the tip of the triangular tabs 72. A positive engagement is attained between each of the abutment surfaces 62 and the edge 82. When the cylindrical article is removed from the forming fixture, the edge 84 returns to the position shown in FIGURE 16 in abutting engagement with the tab means 72. The return movement is caused by the tendency of the cylindrically formed article to return to the cylindrical size to which it was formed in the forming fixture after the radial expansion over the enlarged head 156. The return movement creates a positive engagement between tab means 72 and the edge 84 and with the previously obtained positive engagement between the tab means 44 and the edge 82 forms the four-way interlock of this invention. The triangular configuration of the tab means 72 provides a minimum area of contact between the tab means and the end portion 32 as the article is expanded. Thus, only a substantially point contact of engagement is possible between the tab means 72 and the adjacent side surface of the end portion. Such an arrangement facilitates seating of the edge 84 against the tab means 72. The slot 166 in the core prevents inadvertent displacement of the tab members and allows the overlapped portion of the end portion 32 to be completely seated within the confines of the tab means 38, 40.

After the formed cylindrical shell has been removed from the core it may be handled for further assembly work, storage, and transportation without breaking the interlock formed during the forming operation. Once the interlock has been formed it provides resistance to movement in any direction between the ends of the cylindrical member. Accordingly, the originally flat seated material is securely fastened in a cylindrical form by the use of integrally formed fastening means without the use of any external fastening devices.

Various modifications and changes in the illustrative form of the invention will readily occur to those skilled in the art to which this invention relates. For example, the number and the arrangement of the interlock tabs may be varied as desired. In addition, although particularly advantageous results are obtained from the configuration of the tab means provided, other configurations may obviously be used to apply the principles herein disclosed. It is also contemplated that the method of assembling and fastening the flat sheet of material into a cylindrical form will have application with other types of apparatus. Accordingly, it is intended that the scope of this invention be construed to include modifications and variations of the illustrative disclosures which utilize the inventive principles embodied therein.

What is claimed is:

1. The method of forming a connection between overlapping ends of sheet material comprising the steps of positioning the ends in overlapping relationship, forming an offset tab means in one of the ends at a point disposed in the overlapping area of the ends, moving the ends relative to each other to decrease the overlap therebetween sufficiently for the formed tab to engage the outer edge of the other end for precluding relative movement in the return direction, and providing means for precluding relative movement between the ends in a direction opposite to the return direction.

2. The method of forming a connection between overlapping ends of sheet material comprising the steps of positioning the ends in overlapping relationship, forming first integral tab means in one of the ends in the overlapping area between the ends, forming an aperture in the other of the ends in the overlapping area between the ends, forming second integral tab means in the one end overlying the aperture and extending through it, and moving the ends relative to each other to decrease the amount of overlap sufficiently for the first tab means to engage the outer edge of the other end.

3. The method of forming a cylindrical object from sheet material comprising the steps of forming a substantially cylindrical shape from a flat piece with overlapping ends, forming first integral tab means in one of the ends in the overlapping area between the ends, forming an aperture in the other of the ends in the overlapping area between the ends, forming second integral tab means in the one end overlying the aperture and extending through it, and moving the ends relative to each other to decrease the amount of overlap sufficiently for the first tab means to engage the outer edge of the other end.

4. The method of forming a connection between overlapping ends of sheet material comprising the steps of positioning the ends in overlapping relationship, forming first triangular tab means in one of the ends in the overlapping area between the ends, forming an aperture in the other of the ends in the overlapping area between the ends, forming second integral tab means in the one end overlying the aperture and extending through it, and moving the ends relative to each other to decrease the amount of overlap sufficiently for the first triangular tab means to engage the outer edge of the other end.

5. The method of forming a substantially cylindrical object from sheet material comprising the steps of forming a substantially cylindrical shape from a flat piece with overlapping ends, forming first triangular tab means in one of the ends in the overlapping area between the ends, forming an aperture in the other of the ends in the overlapping area between the ends, forming second integral tab means in the one end overlying the aperture and extending through it, and moving the ends relative to each other to decrease the amount of overlap sufficiently for the first triangular tab means to engage the outer edge of the other end.

6. The method of forming a connection between overlapping ends of sheet material comprising the steps of positioning the ends in overlapping relationship, forming first triangular tab means in one of the ends in the overlapping area between the ends, forming a rectangular aperture in the other of the ends in the overlapping area between the ends, forming second rectangular tab means in the one end overlying the aperture and extending through it, and moving the ends relative to each other to decrease the amount of overlap sufficiently for the first triangular tab means to engage the outer edge of the other end.

7. The method of forming a substantially cylindrical object from sheet material comprising the steps of forming a substantially cylindrical shape from a flat piece with overlapping ends, forming first triangular tab means in one of the ends in the overlapping area between the ends, forming a rectangular aperture in the other of the ends in the overlapping area between the ends, forming second rectangular tab means in the one end overlying the aperture and extending through it, and moving the ends relative to each other to decrease the amount of overlap sufficiently for the first triangular tab means to engage the outer edge of the other end.

8. The method as set forth in claim 7 wherein the first and second tab means are formed at an acute angle with respect to the one end and extend radially inwardly of the cylindrical element.

9. The method of forming a connection between overlapping ends of sheet material comprising a steps of positioning the ends in overlapping relationship, forming first tab means in one of the ends in the overlapping area between the ends, simultaneously forming an aperture in the other of the ends in the overlapping area and forming second tab means in the one end extending through the aperture, and moving the ends relative to each other to decrease the amount of overlap sufficiently for the first tab means to engage the outer edge of the other end.

10. The method of forming a substantially cylindrical object from sheet material comprising the steps of forming a substantially cylindrical shape from a flat piece with overlapping ends, forming first tab means in one of the ends in the overlapping area between the ends, simultaneously forming an aperture in the other of the ends in the overlapping area for forming second tab means in the one end extending through the aperture, and moving the ends relative to each other to decrease the amount of overlap sufficiently for the first tab means to engage the outer edge of the other end.

11. The method as set forth in claim 10 wherein the aperture is formed by simultaneously forming third tab means in the other end upon the formation of the second tab means, the second and third tab means having substantially the same configuration.

References Cited
UNITED STATES PATENTS

| | | | |
|---|---|---|---|
| 597,056 | 1/1898 | Dieckmann | 138—167 X |
| 698,623 | 4/1902 | Barclay | 138—162 X |
| 2,656,969 | 10/1953 | Kvasnok et al. | 229—4.5 X |
| 2,919,807 | 1/1960 | Briggs | 210—487 |

REUBEN FRIEDMAN, *Primary Examiner.*

J. DE CESARE, *Assistant Examiner.*